United States Patent [19]

Dubois

[11] 4,164,754
[45] Aug. 14, 1979

[54] METHOD OF MANUFACTURING A DIE DESIGNED TO DUPLICATE A VIDEO FREQUENCY SIGNAL RECORDING

[75] Inventor: Jean-Claude Dubois, Paris, France

[73] Assignee: Thomson-Brandt, Paris, France

[21] Appl. No.: 794,641

[22] Filed: May 6, 1977

Related U.S. Application Data

[63] Continuation of Ser. No. 595,315, Jul. 11, 1975, abandoned.

[30] Foreign Application Priority Data

Jul. 16, 1974 [FR] France .................................. 74 24668

[51] Int. Cl.² .............................................. H04N 5/86
[52] U.S. Cl. ......................................... 358/128; 96/36;
179/100.3 V; 427/53; 427/259; 427/264
[58] Field of Search ............... 204/15, 192 C; 427/88,
427/89, 259, 264, 53; 358/128; 179/100.3 V;
96/36, 36.3

[56] References Cited

U.S. PATENT DOCUMENTS

| | | | |
|---|---|---|---|
| 3,463,667 | 8/1969 | Chopra | 427/248 R |
| 3,567,508 | 3/1971 | Cox et al. | 427/89 |
| 3,617,373 | 11/1971 | Mott | 427/259 X |
| 3,842,194 | 10/1974 | Clemens | 358/128 |
| 3,894,179 | 7/1975 | Jacobs et al. | 179/100.3 V |
| 3,922,774 | 12/1975 | Lindmayer et al. | 204/15 X |
| 4,057,831 | 11/1977 | Jacobs et al. | 358/128 |

OTHER PUBLICATIONS

*An Introduction to Photofabrication using Kodak Photosensitive Resists,* Eastman Kodak Company, Publication No. F79, 1967, pp. 7–8.

*Primary Examiner*—Evan K. Lawrence
*Attorney, Agent, or Firm*—Cushman, Darby & Cushman

[57] ABSTRACT

A method of manufacturing a metallic die intended for the duplication of a video frequency signal recording. A master impression is engraved in a positive photosensitive resin layer having a thickness on the order of 3000 to 4000 A and covering a metallic substrate, by exposing the layer to a laser beam modulated by the signal which is to be recorded and removing the exposed portions of the layer to bare the underlying substrate. A metal layer substantially equal to the thickness of the initial photosensitive layer is deposited on the non-exposed photosensitive layer and the bared portions of the substrate. Thereafter, the non-exposed photosensitive material and overlying portions of the metal layer are eliminated by a solvent for the non-exposed photosensitive material to form the metal projections of the die.

5 Claims, 4 Drawing Figures

METHOD OF MANUFACTURING A DIE DESIGNED TO DUPLICATE A VIDEO FREQUENCY SIGNAL RECORDING

This is a continuation of application Ser. No. 595,315 filed July 11, 1975, abandoned.

BACKGROUND OF THE INVENTION

The present invention relates to a method of manufacturing a die designed for the duplication of a video frequency signal recording. It relates in particular to the reproduction of flexible or rigid discs comprising hollow or projecting impressions capable of being read out optically. These impressions, for example, form a succession of diffractive elements which translate television signals by virtue of their mutual spacing and non-uniform lengths. The impression takes the form of an extremely fine engraved formation (hollows or projections of the order of one micron, interval between turns of the track, of the same order).

The technique of information broadcasting, through the medium of a physical data carrier which enables storage and later reconstitution to be carried out in the case hereinbefore referred to, comprises the following three stages: (1) the engraving of a "master impression" on a first data carrier, the latter being for example a rigid disc receiving the impressions in the form of a spiral track; (2) manufacture of a die which is a "counterpart" of the recording; (3) duplication of the master impression by the repeated pressing of as many flexible or rigid discs as it is required to produce.

In a first known method, the first stage consists in engraving a photosensitive resin film, commenced in exposing it by a fine laser beam modulated by the signal which is to be recorded and focussed on to the resin, this being followed by development of the resin. The second stage is carried out in two steps using electrolysis, the first step involving deposition of silver by electrolytic techniques upon an insulating substrate (the "ELECTROLESS" process), the second involving the deposition of nickel upon the silver layer. The third stage is a conventional pressing operation producing hollow impressions in a transparent thermoplastic material. This method does not give a very few accurate engraved formation in the photosensitive resin film.

In a second known method, the accuracy is better because a laser is used to engrave a very thin volatilisable film formed upon a film of photosensitive resin which is subsequently exposed and subjected to a complementary chemical operation in order to achieve the optimum depth. The second and third stages are similar to those of the first method.

In a third known method, engraving is carried out in the manner employed in the second method referred to earlier but a film is used which is constituted by a volatisable organic polymer covered with a thin gold film. Because of the presence of this electrically conductive metal, direct electrolytic deposition can be carried out without using any photosensitive resin and this eradicates one stage although it yields a die which is a replica of that obtained in the previous methods so that it is necessary to produce a counterpart by electrolysis, if it is required to produce impressions of hollow kind after the pressing operation. In the three methods described hereinbefore, the die has to have a solid and rigid base which can be achieved by continuing electrolytic deposition of metal until a substantial thickness has been built up. This is a time consuming and expensive technology. The invention makes it possible to overcome these drawbacks by avoiding the need for any metal deposition by electrolytic methods.

SUMMARY OF THE INVENTION

In accordance with the invention, there is provided a method of manufacturing a die intended for the duplication of a video frequency signal recording, comprising the following stages: a first stage involving forming a master impression consisting of cavities corresponding to said signals in a layer of a material on a metallic substrate, the material being dissolvable by an agent without affecting a selected metal; and a second stage involving the two following steps:

a first step comprising the deposition of a layer of the selected mettal on the master impression, a second step comprising the complete elimination of the material and overlying portions of the metal layer by the agent in order to leave behind only the metal projections adhering to the substrate in the positions formerly occupied by the cavities.

BRIEF DESCRIPTION OF THE DRAWINGS

The invention will be better understood and other of its features rendered apparent from a consideration of the ensuing description and the accompanying drawings where, in FIGS. 1 to 4, schematic sections, at various stages of the process in accordance with the invention, through a portion of a substrate or carrier during its conversion into a die, have been shown.

DESCRIPTION OF THE PREFERRED EMBODIMENTS

Figure 1:
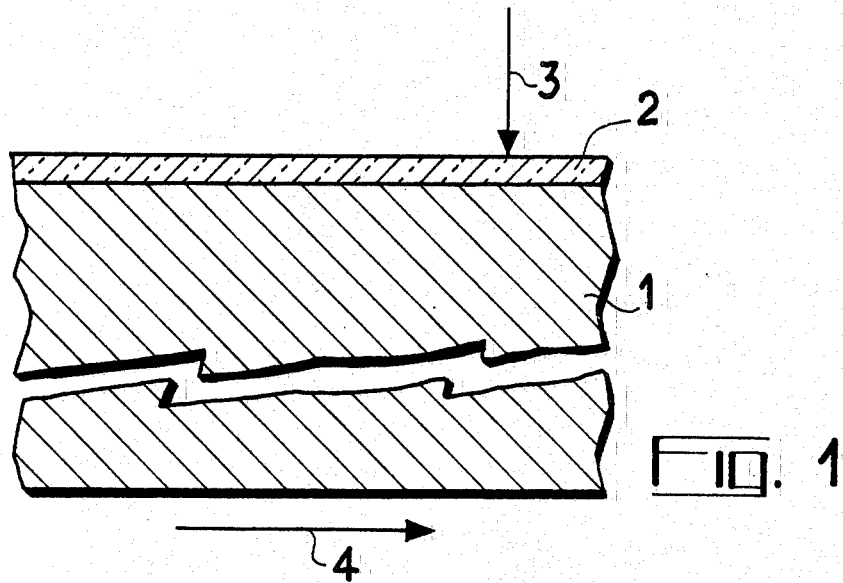

FIG. 1 is a fragmentary view of the carrier 1 which for example is a circular disc of chromium plated nickel, 5 mm in thickness, having good mechanical rigidity. The section has been chosen in such a fashion as to ultimately illustrate, at the surface of the disc, the longitudinal profile of a recording track. The disc is covered with a layer 2 of a positive photosensitive resin. The choice of a positive resin makes it possible ultimately to obtain a relief-engraved die. The thickness of the layer 2, will be for example of the order to 3000 to 4000 angstrom units but the method is applicable even where this thickness differs substantially from the quoted figures.

Amongst the photosensitive materials which have given good results is Shipley AZ 1350, a positive acting photosensitive resin composed of a photoactive compound, a base resin and a solvent manufactured under this name by Shipley Company (Newton, Mass.).

A laser beam has been illustrated simply by an arrow 3 and is focussed on the layer 2 by a device which has not been shown. The carrier 1, during the modulation of the beam (corresponding to the signals which are to be recorded) is imparted a motion symbolised by an arrow 4, causing the carrier to displace beneath the beam 3 so that in the resin layer a very tight spiral is described.

The engraving stage hereabove described corresponds to the first stabge of the first known method referred to eariler. However, provided that the layer 2 is covered with a film of volatilisable material, it is also possible without departing from the scope of the invention to utilise the more accurate second method to produce the master impression.

Figure 2:
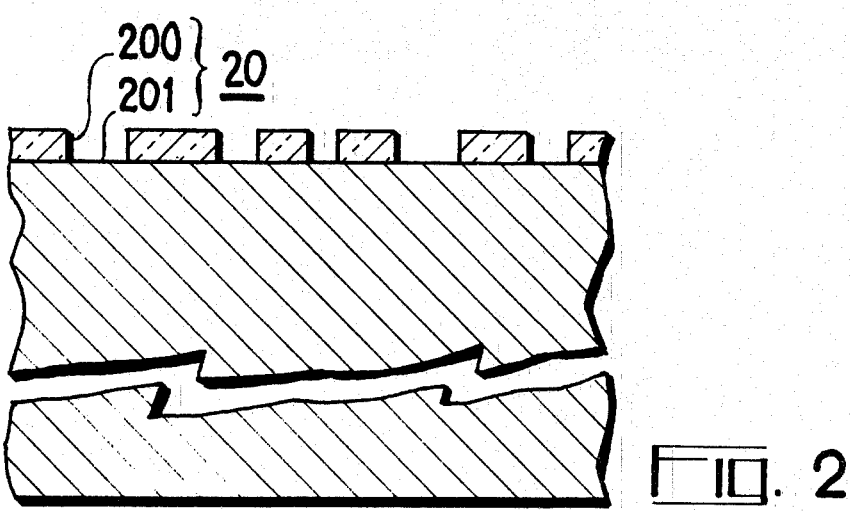

FIG. 2 illustrates the same elements as FIG. 1 after the layer 2 has been processed to produce the successive impressions of the track. The wall 200 of a cavity 20 should be substantially perpendicular to the surface of the carrier 1 and this is something which is readily achieved in the case of a very thin layer 2 (a fraction of a micron); the second method referred to earlier would have to be used in the case of thicker layers. The base 201 of the cavity 20 bares the nickel, something which involves careful etching and cleaning using the products conventionally employed in association with photosensitive resin.

Figure 3:
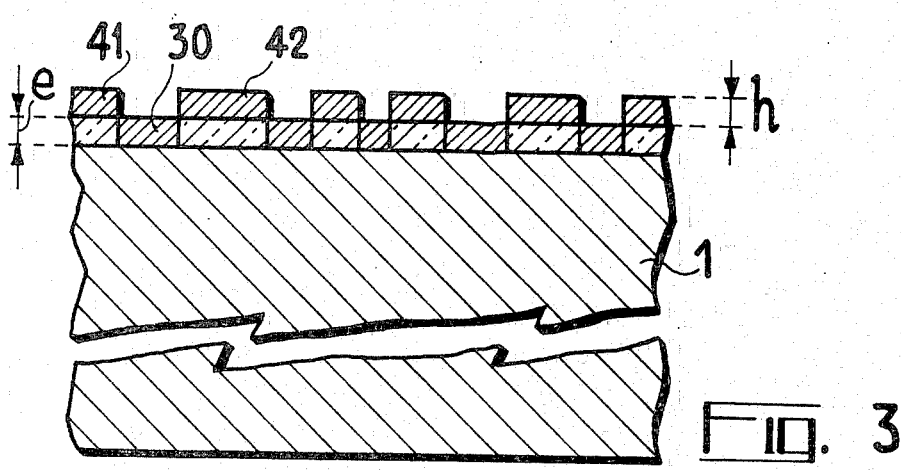
Figure 4:
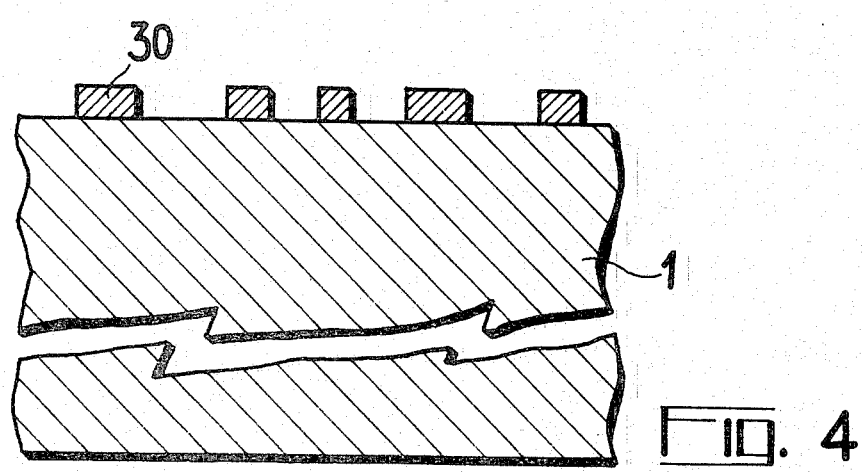

There then follows the first step of the second stage, namely the deposition, for example by vapourisation under vacuum, of a uniform metal layer in an apparatus of known kind. The carrier 1 is arranged in the bell of this apparatus in order to receive the metal upon the spiral of impressions similar to the cavity (FIG. 2). As FIG. 3 shows, the thickness "h" of the deposited metal should be equal to or as near as possible so, the thickness "e" of the initial resin layer, that is to say the depth of the cavity 20. Under these conditions a parallepiped 30 filling a cavity has at the most one common edge with the neighbouring parts 41 and 42 of the layer of metal resting on top of the resin. Vaporization under vacuum enables this condition to be satisfied with sufficient accuracy to achieve good results during the next step.

During the second step of the second stage, the metal-coated carrier is treated with a solvent such as acetone, capable of dissolving the non-exposed resin. Experience shows that if the conditions assumed earlier have been complied with, the metal is removed at the same time as the underlying resin so that a series of dice 30, 31, etc aligned in spiral fashion and forming the counterpart of the recording, is obtained. Using the counterpart it is possible by a hot pressing operation on a disc of thermoplastic material, to produce as many reproductions as required, of the initial master impression. The metal chosen for the operation of deposition under vacuum, will preferably be chromium or rhodium.

What I claim is:

1. In a method of fabricating a die for duplicating a video frequency signal recording:

(1) manufacturing a master impression consisting of a substrate covered with a layer of positive photosensitive material having a thickness on the order of 3000 to 4000 Å; said layer presenting a multiplicity of cavities forming a spiral track in said photosensitive layer, by a process comprising the following steps:

(a) exposing said photosensitive layer using a fine laser beam focussed on the layer and modulated by the signal which is to be recorded, said laser beam and said photosensitive layer moving in relation to each other so as to produce a signal latent impression forming a spiral track onto the substrate;

(b) developing said layer of photosensitive material, to lay bare small portions of said substrate along said spiral track; and (2) manufacturing a die which is a counterpart of the recording and presents a multiplicity of metal projections adhering to said bare portions of the substrate, the heights of said projections being equal to the depths of the cavities of said master impression, by a process comprising the following steps:

(c) depositing a metal layer on said developed layer and on said bare portions of substrate, the thickness of said metal layer being substantially equal to the thickness of the initial photosensitive material; and (d) eliminating the non-exposed photosensitive material thereby carrying away the portions of the metal layer overlying the non-exposed photosensitive material by an agent which dissovles said non-exposed photosensitive material but not said metal, to form said metal projections.

2. A method as claimed in claim 1, wherein said substrate is a rigid metal disc.

3. A method as claimed in claim 1, wherein said metal is chromium.

4. A method as claimed in claim 1, wherein said metal is rhodium.

5. A method as claimed in claim 1, wherein during said step (c), said metal layer is produced using a technique of vaporization under vacuum.

* * * * *